(12) United States Patent
Ingraham et al.

(10) Patent No.: US 10,492,621 B2
(45) Date of Patent: Dec. 3, 2019

(54) MULTI-FUNCTION HIGH CHAIR

(71) Applicant: Wonderland Switzerland AG, Steinhausen (CH)

(72) Inventors: Jerry Ingraham, Denver, PA (US); Jonathan Pacella, Coatesville, PA (US); Nathanael Saint, Morgantown, PA (US); Jennifer Sheldrick, Malvern, PA (US); Patrick Bowers, Hockessin, DE (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 15/943,638

(22) Filed: Apr. 2, 2018

(65) Prior Publication Data

US 2018/0279799 A1  Oct. 4, 2018

Related U.S. Application Data

(60) Provisional application No. 62/481,325, filed on Apr. 4, 2017.

(51) Int. Cl.
*A47D 1/00* (2006.01)
*B60N 2/28* (2006.01)

(52) U.S. Cl.
CPC ............. *A47D 1/006* (2013.01); *A47D 1/004* (2013.01); *A47D 1/0085* (2017.05); *B60N 2/2812* (2013.01)

(58) Field of Classification Search
CPC ........ B60N 2/2812; A47D 1/04; A47D 11/02; A47D 1/006
See application file for complete search history.

(56) References Cited

U.S. PATENT DOCUMENTS

| | | | | | |
|---|---|---|---|---|---|
| 2,418,731 | A | * | 4/1947 | Seitz | A47C 4/021 206/326 |
| 2,516,774 | A | * | 7/1950 | Gottfried | A47D 1/004 297/134 |
| 2,779,389 | A | * | 1/1957 | Pearl | A47D 1/006 297/134 |

(Continued)

FOREIGN PATENT DOCUMENTS

| | | |
|---|---|---|
| CN | 202589009 U | 12/2012 |
| CN | 204306474 U | 5/2015 |

(Continued)

*Primary Examiner* — Timothy J Brindley
(74) *Attorney, Agent, or Firm* — Winston Hsu

(57) ABSTRACT

A multi-function high includes a first child seat and a second child seat. The first child seat includes a first seat portion. A first seating area is formed on the first seat portion. A second child seat includes a second seat portion and an infant insert. The second seat portion is detachably installed on the first seat portion. A second seating area is formed on the second seat portion and smaller than the first seating area. The infant insert is detachably installed on the second seat portion and made of soft and resilient material. A third seating area is formed on the infant insert and smaller than the second seating area. The multi-function high chair can accommodate children of a wide range of ages with the first seating area, the second seating area, or the third seating area selectively.

16 Claims, 11 Drawing Sheets

(56) References Cited

U.S. PATENT DOCUMENTS

| | | | | |
|---|---|---|---|---|
| 5,755,489 A * | 5/1998 | Rossman | A47C 3/34 | |
| | | | 297/338 | |
| 5,951,102 A * | 9/1999 | Poulson | A47D 1/004 | |
| | | | 297/130 | |
| 7,673,934 B2 * | 3/2010 | Bearup | A47D 1/002 | |
| | | | 297/130 | |
| 8,567,867 B2 * | 10/2013 | Arnold, IV | A47D 1/002 | |
| | | | 297/250.1 | |
| 8,602,490 B2 * | 12/2013 | Tsai | A47D 1/10 | |
| | | | 297/130 | |
| 8,919,889 B2 * | 12/2014 | Kane | A47D 15/006 | |
| | | | 297/484 | |
| 9,635,955 B2 * | 5/2017 | Greger | A47D 1/004 | |
| 2008/0088162 A1 | 4/2008 | Fritz | | |
| 2008/0258527 A1 * | 10/2008 | Gower | B60N 2/2812 | |
| | | | 297/256.15 | |
| 2009/0015041 A1 * | 1/2009 | Centracco | A47D 1/006 | |
| | | | 297/136 | |
| 2012/0086240 A1 | 4/2012 | Tsai | | |
| 2013/0241248 A1 | 9/2013 | Kostyniak | | |
| 2016/0174727 A1 * | 6/2016 | Haut | A47D 11/002 | |
| | | | 297/130 | |
| 2016/0192787 A1 | 7/2016 | Perrin | | |
| 2017/0043683 A1 * | 2/2017 | Yang | B60N 2/2812 | |
| 2017/0119172 A1 | 5/2017 | Sclare | | |
| 2017/0258244 A1 | 9/2017 | Waldman | | |

FOREIGN PATENT DOCUMENTS

| | | | | |
|---|---|---|---|---|
| DE | 92 16 287.8 U1 | 5/1993 | | |
| DE | 201 00 083 U1 | 4/2001 | | |
| DE | 10 2015 122 122 A1 | 6/2016 | | |
| EP | 1 364 603 A2 | 11/2003 | | |
| EP | 2 008 550 A1 | 12/2008 | | |
| EP | 2 092 857 A2 | 8/2009 | | |
| FR | 2919164 A1 * | 1/2009 | | A47D 1/004 |
| GB | 2534683 A | 8/2016 | | |
| WO | 2004/086916 A2 | 10/2004 | | |
| WO | 2009/158134 A1 | 12/2009 | | |

\* cited by examiner

MULTI-FUNCTION HIGH CHAIR

CROSS REFERENCE TO RELATED APPLICATIONS

This application claims the benefit of U.S. Provisional Patent Application No. 62/481,325, filed on Apr. 4, 2017, which is hereby incorporated by reference in its entirety.

BACKGROUND OF THE INVENTION

1. Field of the Invention

The present invention relates to a child product, and more particularly, to a multi-function high chair adapted for children of a wide range of ages.

2. Description of the Prior Art

In order for caregivers to feed and care for their children, a number of child products are employed. A high chair provides a means for the caregivers to place their children for spoon or bottle feeding. The conventional high chair usually affords a number of convenience features, such as a reclining seatback and a height adjustment mechanism. However, the conventional high chair is usually constructed of injection-molded thermoplastic and metal tubing and adapted for children from 6 months to about 2 years of ages only. Therefore, there is a need for improvement of the highchair to allow children of a wider range of ages to sit therein.

SUMMARY OF THE INVENTION

Therefore, it is an objective of the present invention to provide a multi-function high chair adapted for children of a wide range of ages for solving the aforementioned problems.

In order to achieve the aforementioned objective, the present invention discloses a multi-function high chair including a first child seat and a second child seat. The first child seat includes at least one leg component and a first seat portion. The first seat portion is installed on the at least one leg component. A first seating area is formed on the first seat portion. The second child seat includes a second seat portion and an infant insert. The second seat portion is detachably installed on the first seat portion. A second seating area is formed on the second seat portion and smaller than the first seating area. The infant insert is detachably installed on the second seat portion and made of soft and resilient material. A third seating area is formed on the infant insert and smaller than the second seating area. The second seat portion is installed on the first seat portion to cover the first seating area for allowing a child to sit in the second seating area when the infant insert is detached from the second seat portion to expose the second seating area. The second seat portion is capable of being detached from the first seat portion to expose the first seating area for allowing the child to sit in the first seating area, and the infant insert is installed on the second seat portion to cover the second seating area for allowing the child to sit in the third seating area.

According to an embodiment of the present invention, the multi-function high chair further includes a seatback assembly selectively and detachably installed on the first seat portion or the second seat portion.

According to an embodiment of the present invention, the seatback assembly includes a back portion and a padding component for at least covering a front side of the back portion.

According to an embodiment of the present invention, the seatback assembly includes a back portion, a pair of shoulder harness anchors and at least two pairs of engaging sockets formed on the back portion and at different heights, and a pair of shoulder harness straps are connected to the back portion by engagement of the pair of the shoulder harness anchors and one pair of the at least two pairs of engaging sockets.

According to an embodiment of the present invention, each shoulder harness anchor includes a resilient engaging portion and a connecting portion connected to the resilient engaging portion. Each shoulder harness strap is sewed onto the corresponding connecting portion. Each engaging socket is formed on a front side of the back portion, and the connecting portion is exposed out of the corresponding engaging socket when each shoulder harness anchor is slidably installed into the corresponding engaging socket to engage the resilient engaging portion with the corresponding engaging socket.

According to an embodiment of the present invention, the second seat portion includes a seat part and a seatback part pivotally connected to the seat part, and the seatback assembly is capable of being reclined relative to the seat part at different angles by pivoting the seatback part relative to the seat part when the seatback assembly is installed on the seatback part.

According to an embodiment of the present invention, the second seat portion includes a seat part and a seatback part pivotally connected to the seat part.

According to an embodiment of the present invention, the second child seat further includes an engaging component, a driving component and a linking component. The driving component is movably disposed on the seatback part. The engaging component is retractably disposed on the seatback part. The linking component is connected to the driving component and the engaging component. A plurality of engaging portions is formed on the seat part. The seatback part is fixed relative to the seat part when the engaging component engages with one of the plurality of engaging portions, and the seatback part is pivotally relative to the seat part when the driving component drives the engaging component by the linking component to retract so as to disengage the engaging component from the one of plurality of the engaging portions.

According to an embodiment of the present invention, the second child seat further includes a sliding drawer slidably disposed on a bottom side of the second seat portion for accommodating an attachment strap.

According to an embodiment of the present invention, the sliding drawer obstructs the second seat portion from being installed on the first seat portion when the sliding drawer is not completely closed.

According to an embodiment of the present invention, the second child seat further includes a snapping component disposed on the second seat portion. A snapping recess is formed on the first seat portion and located at a position corresponding to the snapping component, and the sliding drawer obstructs the snapping component from engaging with the snapping recess when the sliding drawer is not completely closed.

According to an embodiment of the present invention, the second child seat further includes a liner disposed on an inner periphery of the second seat portion to surround the second seating area.

According to an embodiment of the present invention, the second child seat further includes a tray detachably installed on the second seat portion.

According to an embodiment of the present invention, the second child seat further includes a snapping component disposed on the second seat portion. A snapping recess is formed on the first seat portion and located at a position corresponding to the snapping component. The second seat portion is fixed on the first seat portion by engagement of the snapping component and the snapping recess, and the second seat portion is detached from the first seat portion by disengagement of the snapping component and the snapping recess.

In order to achieve the aforementioned objective, the present invention further discloses a multi-function high chair including a first child seat, a second child seat and a seatback assembly. The first child seat includes at least one leg component and a first seat portion installed on the at least one leg component. A first seating area is formed on the first seat portion. The second child seat includes a second seat portion detachably installed on the first seat portion. A second seating area is formed on the second seat portion and smaller than the first seating area. The seatback assembly is selectively and detachably installed on the first seat portion or the second seat portion. The seatback assembly includes a back portion, at least two pairs of engaging sockets and a pair of shoulder harness anchors. The at least two pairs of engaging sockets are formed on the back portion and at different heights. The pair of shoulder harness anchors are for engaging with one pair of the at least two pairs of engaging sockets. A pair of shoulder harness straps are connected to the back portion by engagement of the pair of the shoulder harness anchors and the one pair of the at least two pairs of engaging sockets.

According to an embodiment of the present invention, each shoulder harness anchor includes a resilient engaging portion and a connecting portion connected to the resilient engaging portion. Each shoulder harness strap is sewed onto the corresponding connecting portion. Each engaging socket is formed on a front side of the back portion, and the connecting portion is exposed out of the corresponding engaging socket when each shoulder harness anchor is slidably installed into the corresponding engaging socket to engage the resilient engaging portion with the corresponding engaging socket.

In order to achieve the aforementioned objective, the present invention discloses a multi-function high chair including a first child seat, a second child seat and a seatback assembly. The first child seat includes at least one leg component and a first seat portion installed on the at least one leg component. A first seating area is formed on the first seat portion. The second child seat includes a second seat portion detachably installed on the first seat portion. A second seating area is formed on the second seat portion and smaller than the first seating area. The seatback assembly is selectively and detachably installed on the first seat portion or the second seat portion. The second seat portion is installed on the first seat portion to cover the first seating area for allowing the seatback assembly to be installed on the second seat portion, and the second seat portion is capable of being detached from the first seat portion to expose the first seating area for allowing the seatback assembly to be installed on the first seat portion.

In summary, the present invention utilizes the first seat portion, the second seat portion and the infant insert to selectively provide the first seating area, the second seating area and the third seating area which have different sizes for accommodating children of different ages. Therefore, it provides caregivers with the multi-function high chair in different using states with growth of a child. Furthermore, the second child seat can be used independently as a floor seat or a booster seat and also can be attached onto an adult chair by the attachment strap after the second child seat has been detached from the first child seat. The sliding drawer can accommodate the attachment strap for preventing a potential strangulation hazard due to the hanging attachment strap. Besides, the pair of shoulder harness straps are connected to the back portion by the engagement of the pair of the shoulder harness anchors and the corresponding pair of engaging sockets. Therefore, it provides a convenient way to adjust the pair of shoulder harness straps according to children of different ages.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
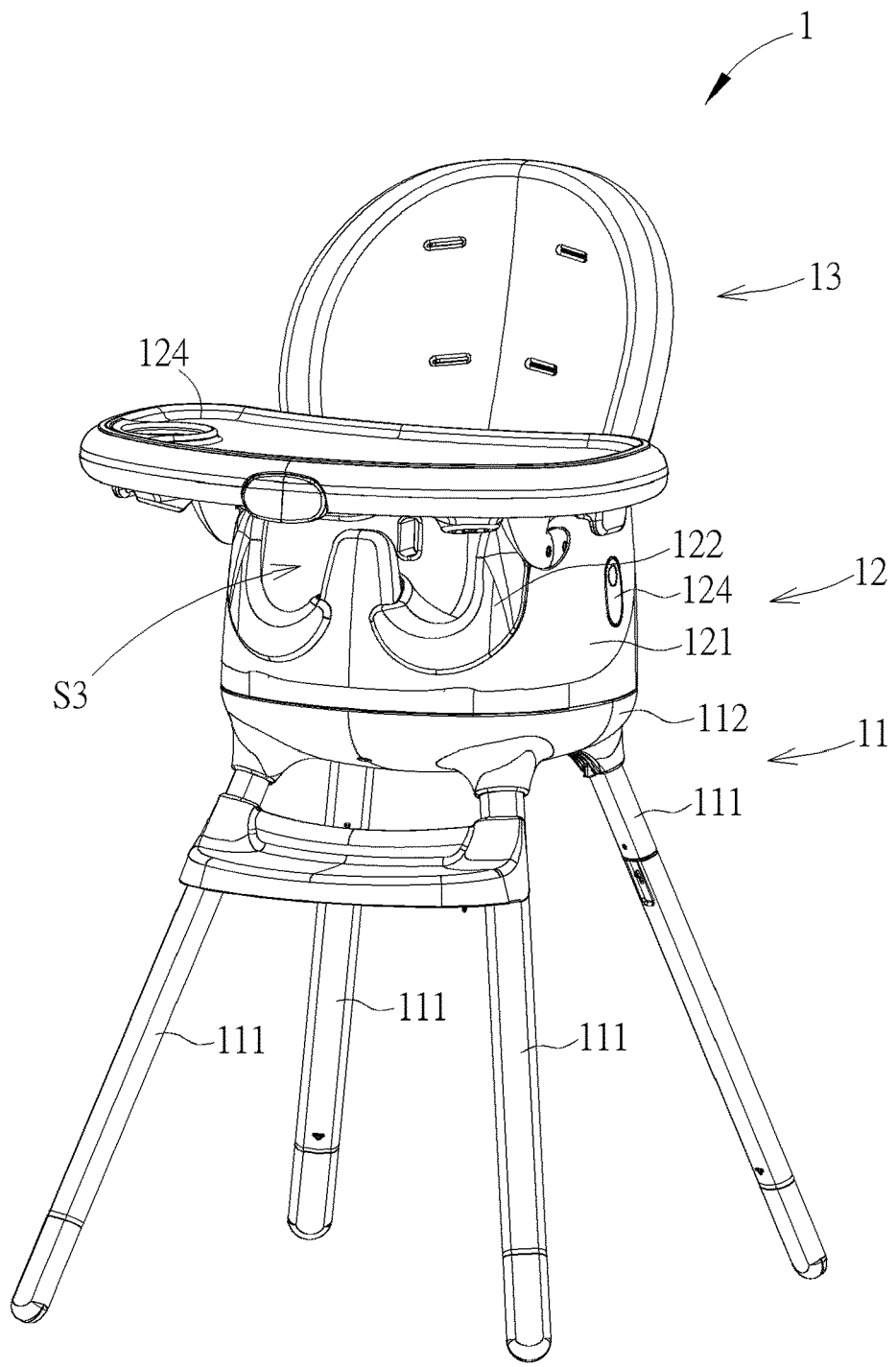
FIG. 1 to FIG. 3 are schematic diagrams of a multi-function high chair in different using states according to an embodiment of the present invention.
Figure 2:
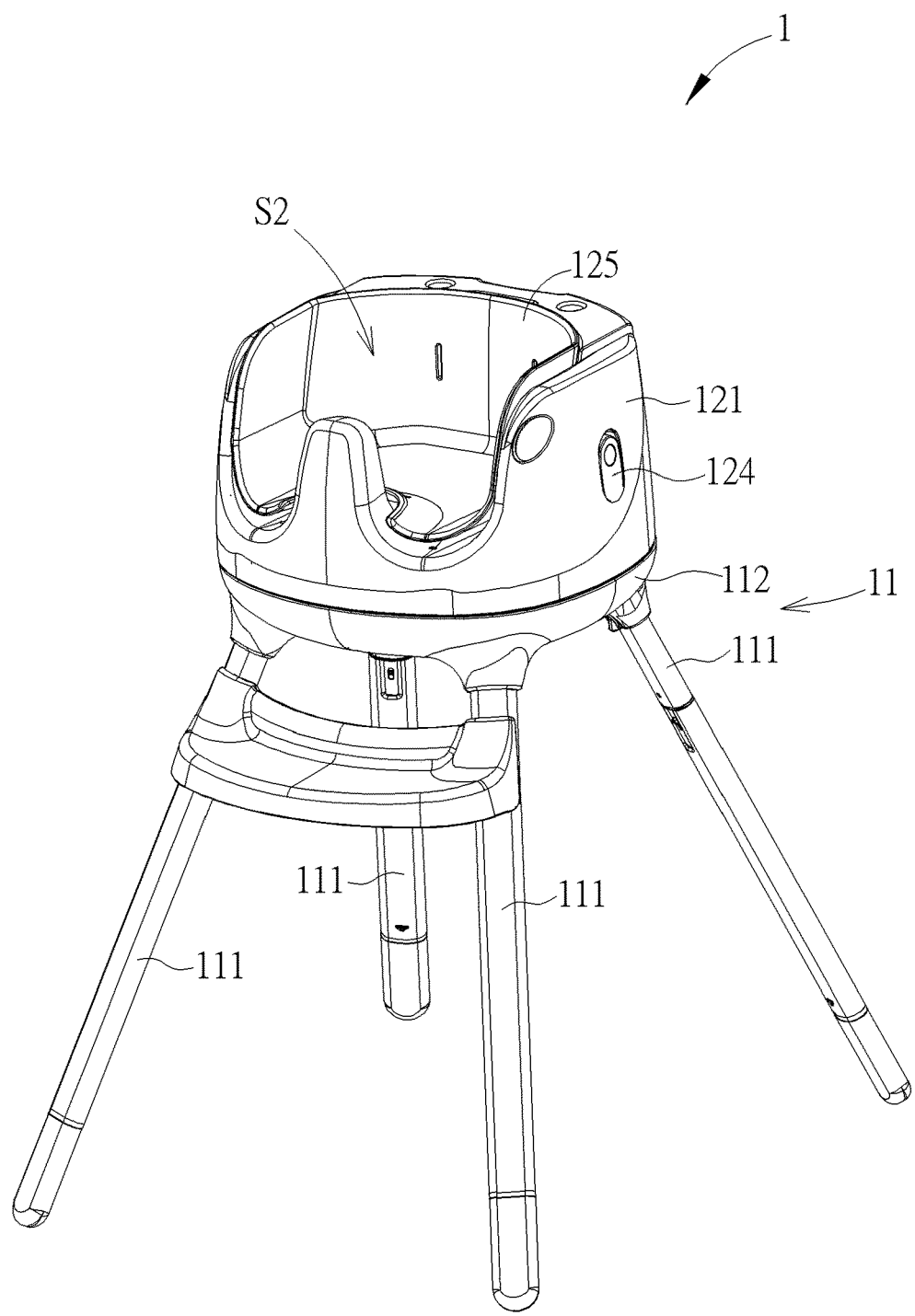
Figure 3:
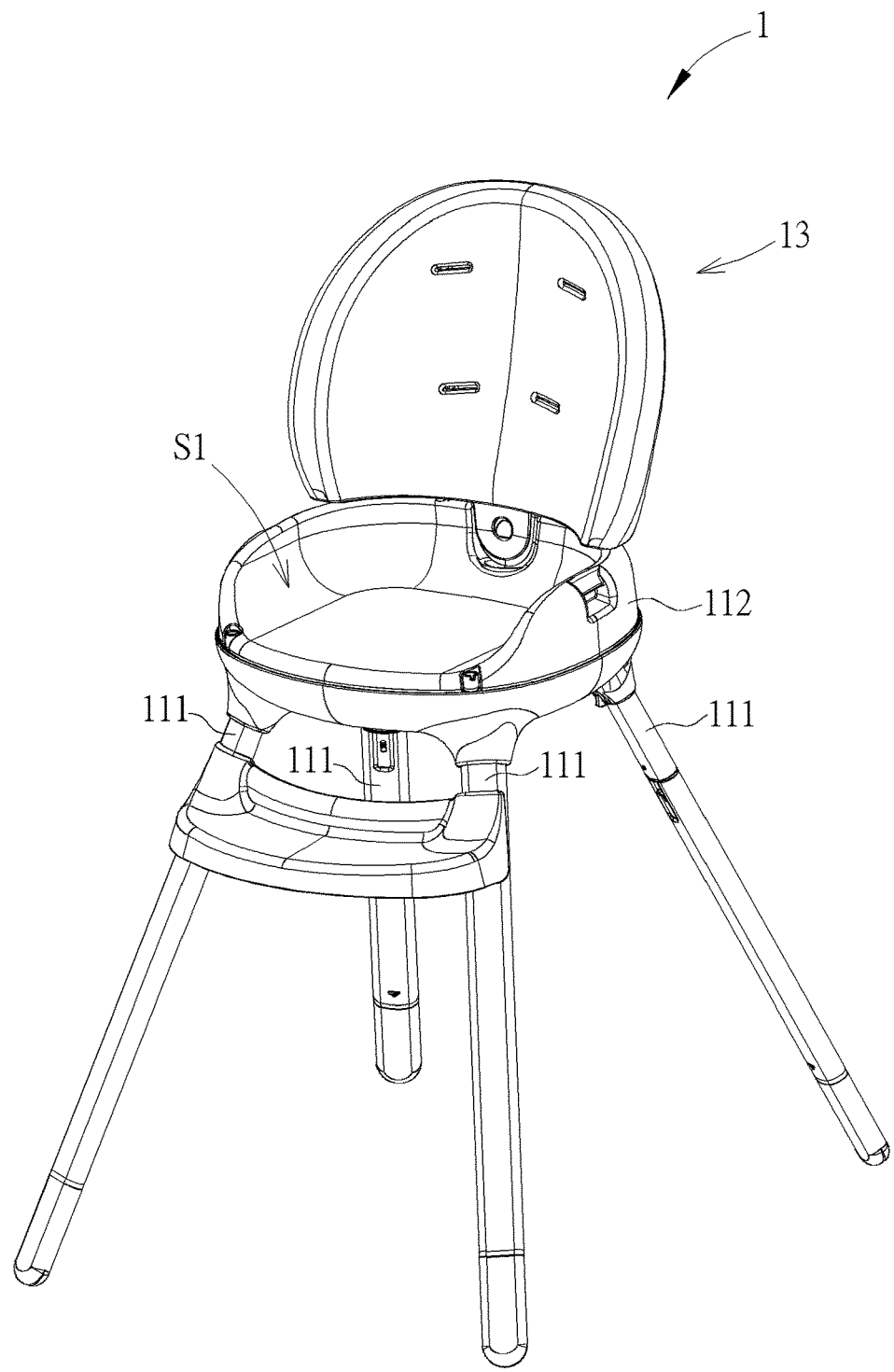
Figure 4:
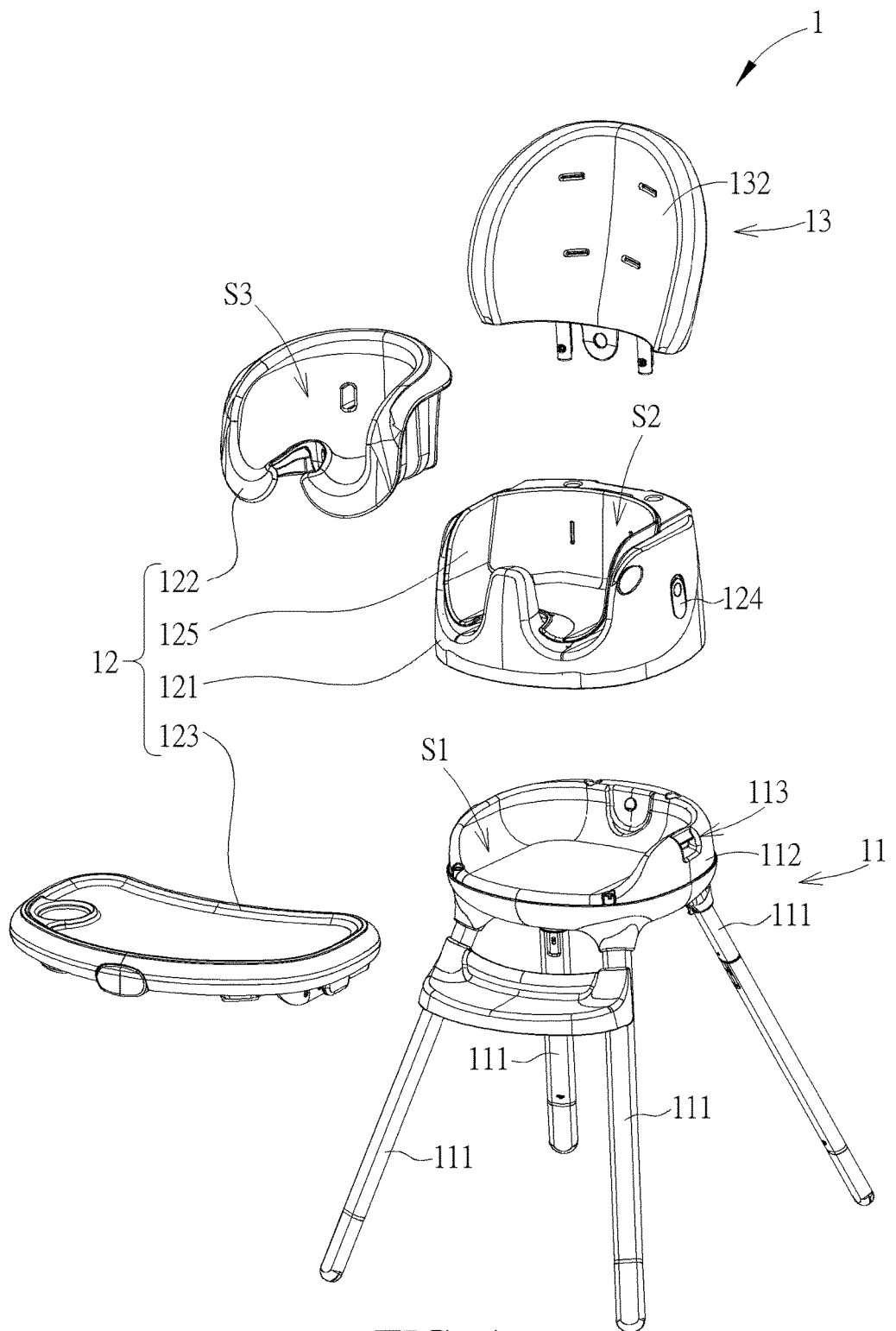
FIG. 4 is a partial exploded diagram of the multi-function high chair according to the embodiment of the present invention.

Please refer to FIG. 1 to FIG. 4. FIG. 1 to FIG. 3 are schematic diagrams of a multi-function high chair 1 in different using states according to an embodiment of the present invention. FIG. 4 is a partial exploded diagram of the multi-function high chair 1 according to the embodiment of the present invention. As shown in FIG. 1 to FIG. 3, the multi-function high chair 1 of the present invention can be used in different using states for children of different ages. As shown in FIG. 1 and FIG. 4, the multi-function high chair 1 includes a first child seat 11, a second child seat 12 and a seatback assembly 13. The first child seat 11 includes four leg components 111 and a first seat portion 112. The first seat portion 112 is installed on the four leg components 111. A first seating area S1 is formed on the first seat portion 112 for accommodating a child up to about 4 years of age. The second child seat 12 includes a second seat portion 121, an infant insert 122 and a tray detachably 123. The second portion 121 is detachably installed on the first seat portion 112. A second seating area S2 is formed on the second seat portion 121 and smaller than the first seating area S1 for accommodating a child from 6 months to about 2 years of age. The infant insert 122 is detachably installed on the second seat portion 121. A third seating area S3 is formed on the infant insert 122 and smaller than the second seating area S2 for accommodating a child around 3 months of age. The tray 123 is detachably installed on the second seat portion 121. The seatback assembly 13 is selectively and detachably installed on the second seat portion 121 or the first seat portion 112.

In this embodiment, the second child seat 12 further includes two snapping components 124 disposed on two sides of the second seat portion 121. Two snapping recesses 113 are formed on two sides of the first seat portion 112 and located at positions corresponding to the two snapping components 124. Therefore, the second seat portion 121 can be installed on and detached from the first seat portion 112 by engagement and disengagement of the two snapping components 124 and the two snapping recesses 113 easily. However, the attachment and detachment of the second seat portion 121 and the first seat portion 112 are not limited to this embodiment. It depends on practical demands.

Furthermore, the second seat portion 121 can be installed on the first seat portion 112 to cover the first seating area S1. The second seat portion 121 also can be detached from the first seat portion 112 to expose the first seating area S1. The infant insert 122 can be installed on the second seat portion 121 to cover the second seating area S2. The infant insert 122 also can be detached from the second seat portion 121 to expose the second seating area S2. In such a way, the multi-function high chair 1 can be used in different using states for children of different ages by combination of the first seat portion 112 and the second seat portion 121 and combination of the second seat portion 121 and the infant insert 122. Detailed operational principle of the multi-function high chair 1 is described as follows.

As shown in FIG. 1 and FIG. 4, the second seat portion 121 is installed on the first seat portion 112, and the infant insert 122 is installed on the second seat portion 121. At this moment, the first seating area S1 is covered or hidden by the second seat portion 121, and the second seating area S2 is covered or hidden by the infant insert 122. The third seating area S3 is exposed outside for accommodating a child. Therefore, when the multi-function high chair 1 is in a first state as shown in FIG. 1, the multi-function high chair 1 can be used as a high chair for a child around 3 months of age. Furthermore, in this embodiment, the infant insert 122 can be preferably made of soft and resilient material, such as rubber, poly-urethane (PU) or ethylene-vinyl acetate (EVA), and therefore it not only provides a comfortable environment but also has shape and strength/rigidity to provide support to the child by softly surrounding the child's hips, legs and back, which allows the child to sit up unassisted. For example, the infant insert 122 can be designed to provide support for children who are able to hold their heads up but not necessarily able to sit up unassisted (usually around 3 months old).

As shown in FIG. 2 and FIG. 4, the second seat portion 121 is installed on the first seat portion 112, and the infant insert 122, which is not shown in the figure, is detached from the second seat portion 121. At this moment, the first seating area S1 is covered or hidden by the second seat portion 121, and the second seating area S2 is exposed outside for accommodating a child. Therefore, when the multi-function high chair 1 is in a second state as shown in FIG. 2, the multi-function high chair 1 can be used as a high chair for a child from 6 months to about 2 years of age. Furthermore, in this embodiment, the second child seat 12 can preferably further includes a liner 125 disposed on an inner periphery of the second seat portion 121 to surround the second seating area S2 for improving seating comfort of the child sitting in the second seating area S2.

As shown in FIG. 3 and FIG. 4, the second seat portion 121, which is not shown in the figure, is detached from the first seat portion 112. That is, the second child seat 12 is completely detached from the first child seat 11. At this moment, the first seating area S1 is exposed outside for accommodating a child. Therefore, when the multi-function high chair 1 is in a third state as shown in FIG. 3, the multi-function high chair 1 can be used as a high chair for a child up to about 4 years of age. Furthermore, the seatback assembly 13 can be detached from the second seat portion 121 and installed on the first seat portion 112, if it is desired to provide extra support of the child.

Figure 5:
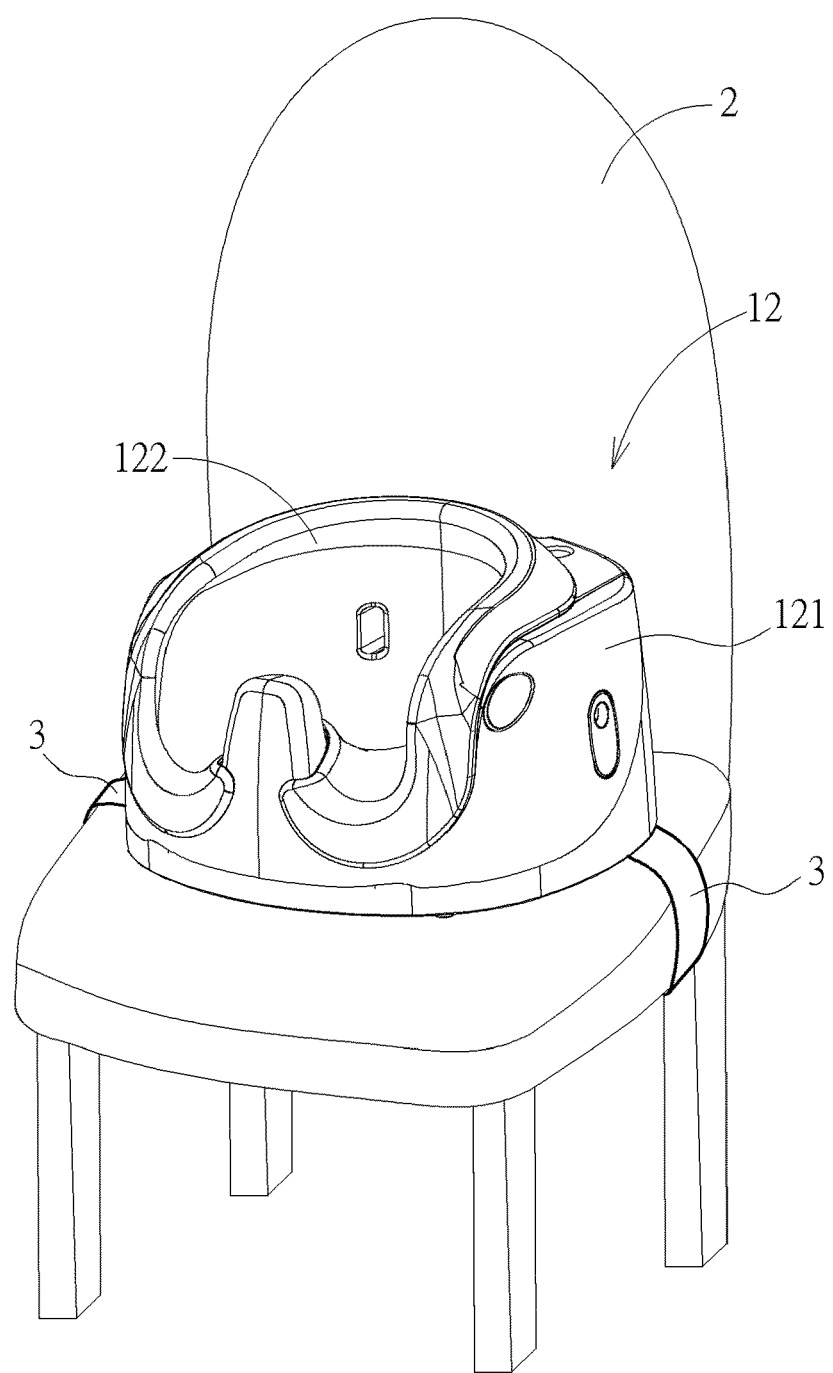
FIG. 5 is a diagram of a second child seat attached onto an adult chair according to the embodiment of the present invention.
Figure 6:
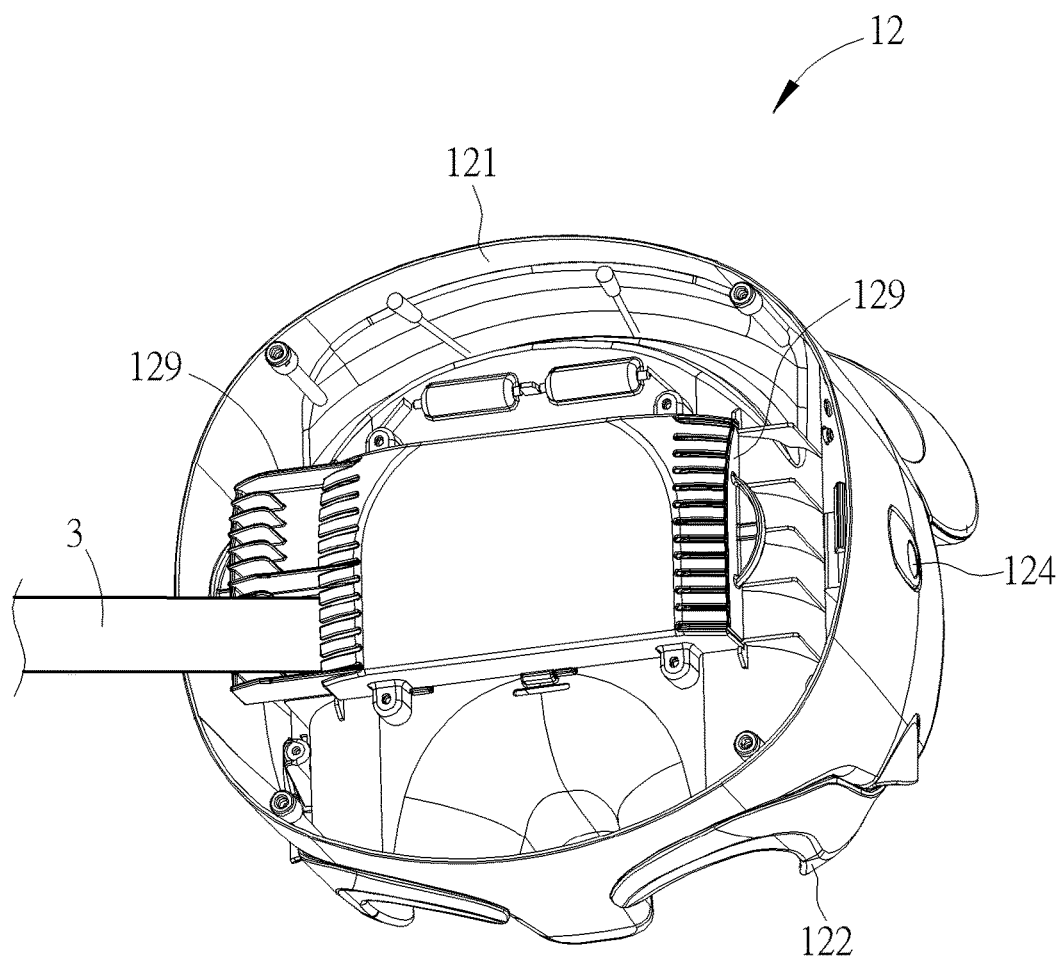
FIG. 6 is a diagram of a bottom side of a second seat portion according to the embodiment of the present invention.

Besides, when the second child seat 12 is detached from the first child seat 11, the second child seat 12 can be taken along or used as a floor seat placed on the floor. The second child seat 12 also can be used as a booster seat which can be attached onto an adult chair by an attachment strap. Specifically, please refer to FIG. 5 and FIG. 6. FIG. 5 is a diagram of the second child seat 12 attached onto an adult chair 2 according to the embodiment of the present invention. FIG. 6 is a diagram of a bottom side of the second seat portion 121 according to the embodiment of the present invention. As shown in FIG. 5 and FIG. 6, the second child seat 12 further includes two sliding drawers 129 slidably disposed on a bottom side of the second seat portion 121 for accommodating two attachment straps 3. Therefore, it provides a convenient way to fasten the second child seat 12 onto the adult chair 2 by the two attachment straps 3 after detaching the second child seat 12 from the first child seat 11. Furthermore, as shown in FIG. 5, the tray 123 and the seatback assembly 13 can be detached from the second seat portion 121, and the infant insert 122 can be installed on the second seat portion 121 for a younger child when the second child seat 12 is attached onto the adult chair 2. However it is not limited thereto.

Besides, as shown in FIG. 4 and FIG. 6, a sliding path of each sliding drawer 129 is between the corresponding snapping component 124 and the corresponding snapping recess 113. Therefore, the sliding drawers 129 obstruct the snapping components 124 from engaging with the snapping recesses 113 when the sliding drawers 129 are not completely closed, i.e., when the attachment straps 3 are not received in the sliding drawers 129 properly. In other words, the sliding drawers 129 obstruct the second seat portion 121 from being installed on the first seat portion 112 when the sliding drawers 129 are not completely closed. It prevents a potential strangulation hazard due to the hanging attachment straps 3. It should be noticed that the seatback assembly 13 and the tray 12 also can be installed on the second seat portion 121 in a condition that the second child seat 12 is detached from the first child seat 11 according to practical demands. It is not limited to the figure of the present invention.

Figure 7:
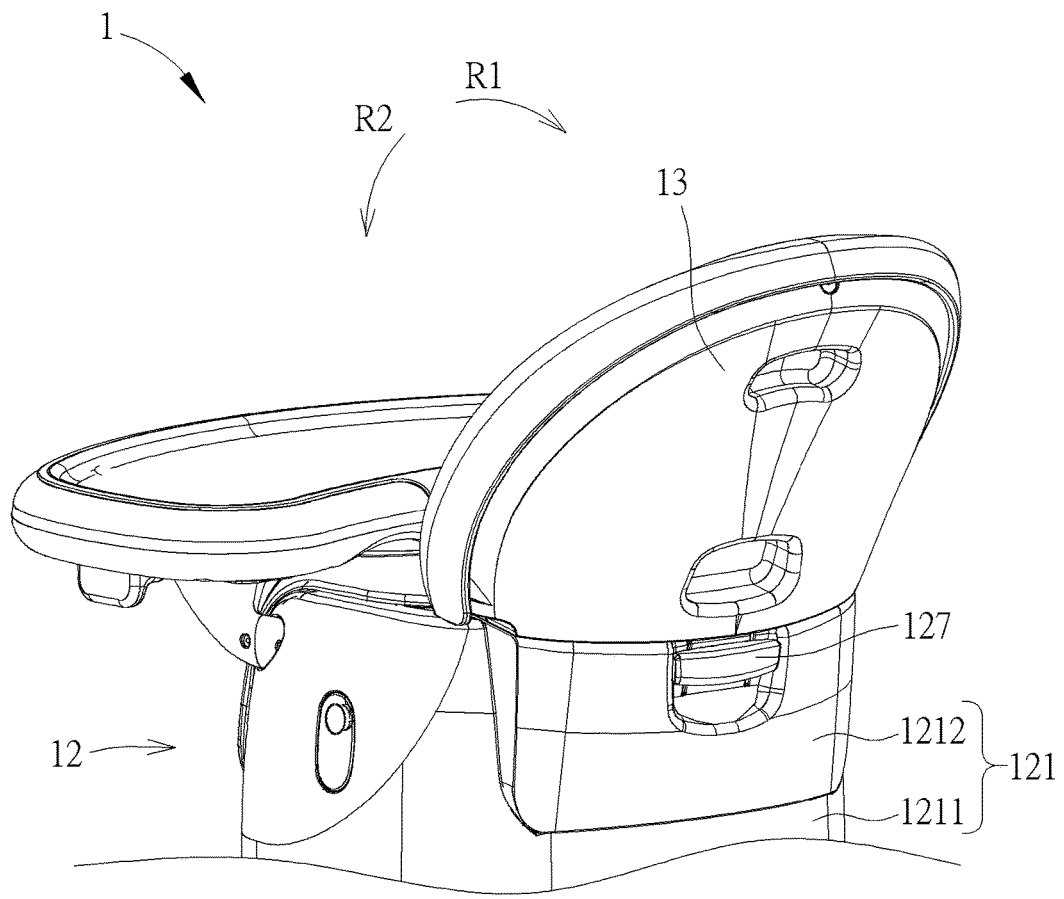
FIG. 7 is a partial diagram of the multi-function high chair with a seatback assembly reclined relative to a seat part of the second seat portion according to the embodiment of the present invention.
Figure 8:
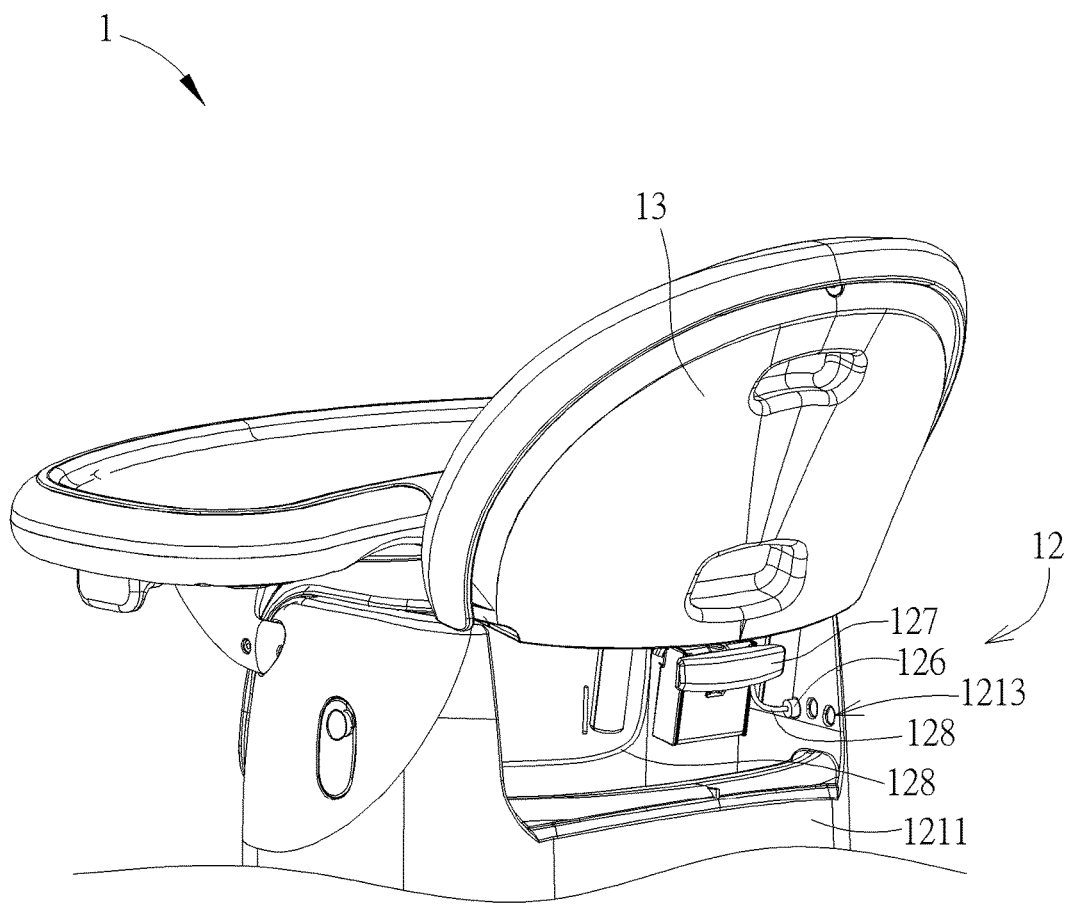
FIG. 8 and FIG. 9 are partial internal structural diagrams of the multi-function high chair at different views according to the embodiment of the present invention.
Figure 9:
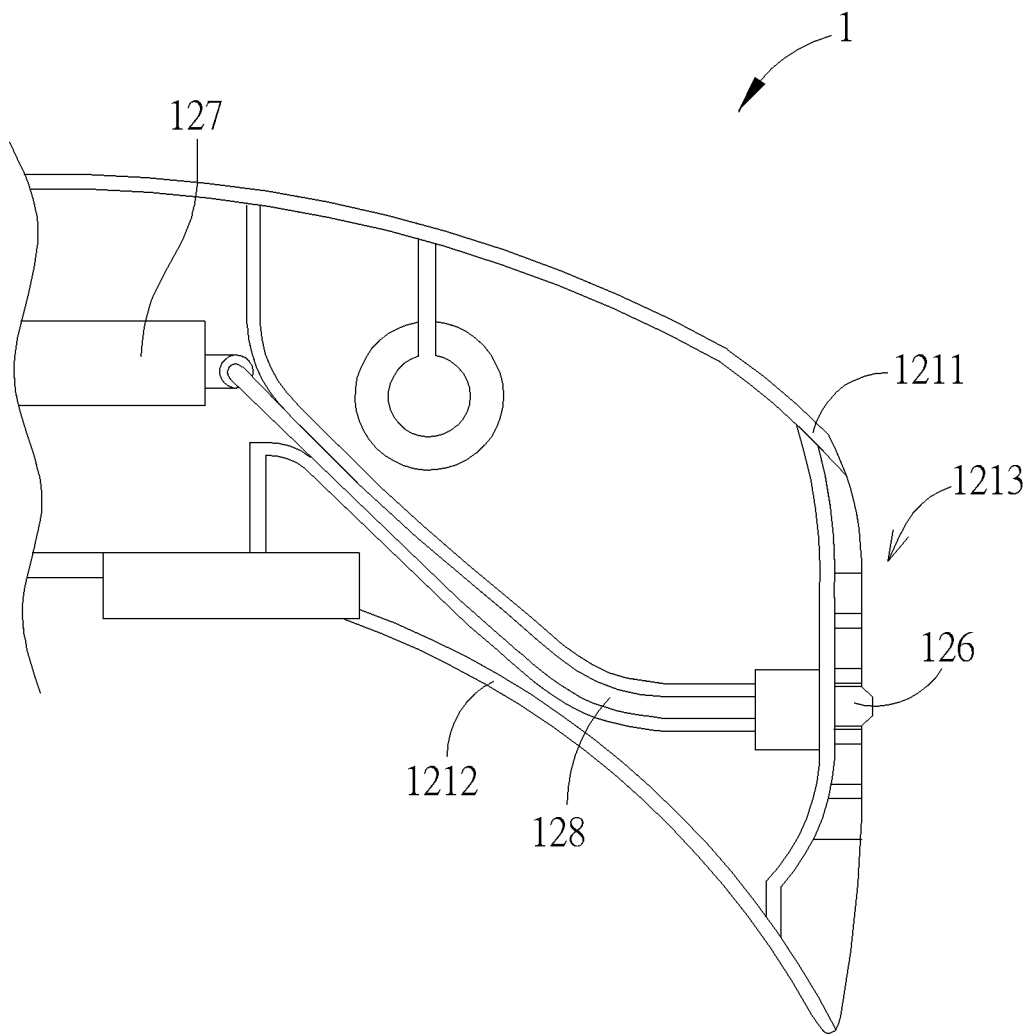

Please refer to FIG. 7 to FIG. 9. FIG. 7 is a partial diagram of the multi-function high chair 1 with the seatback assembly 13 reclined relative to a seat part 1211 of the second seat portion 121 according to the embodiment of the present invention. FIG. 8 and FIG. 9 are partial internal structural diagrams of the multi-function high chair 1 at different views according to the embodiment of the present invention. As shown in FIG. 7 to FIG. 9, the second seat portion 121 includes the seat part 1211 and a seatback part 1212 pivotally connected to the seat part 1211. The seatback assembly 13 is installed on the seatback part 1212. The second child seat 12 further includes two engaging components 126, a driving component 127 and two linking components 128. The driving component 127 is movably disposed on the seatback part 1212. The two engaging components 126 are retractably disposed on the seatback part 1212. Each linking component 128 is connected to the driving component 127 and the corresponding engaging component 126. A plurality of engaging portions 1213 is formed on the seat part 1211. The seatback part 1212 is fixed relative to the seat part 1211 when the engaging component 126 engages with one of the plurality of engaging portions 1213, and the seatback part 1212 is capable of pivoting along a first pivoting direction R1 and a second pivoting direction R2 opposite to the first pivoting direction R1 relative to the seat part 1211 after the driving component 127 has driven the engaging component 126 to retract by the linking component 128 so as to disengage the engaging component 126 from the one of plurality of the engaging portions 1213. In such a way, the seatback assembly 13 is capable of being reclined relative to the seat part 1211 of the second seat portion 121 at different angles, so as to adjust a reclined angle of the seatback assembly 13, by operating the driving component 127 to allow pivotal movement of the seatback part 1212 relative to the seat part 1211 when the seatback assembly 13 is installed on the seatback part 1212. Furthermore, the engaging component 126 can be resiliently recover to engage with another one of the plurality of engaging portions 1213 to fix the reclined angle of the seatback assembly 13 when the driving component 127 is released.

Figure 10:
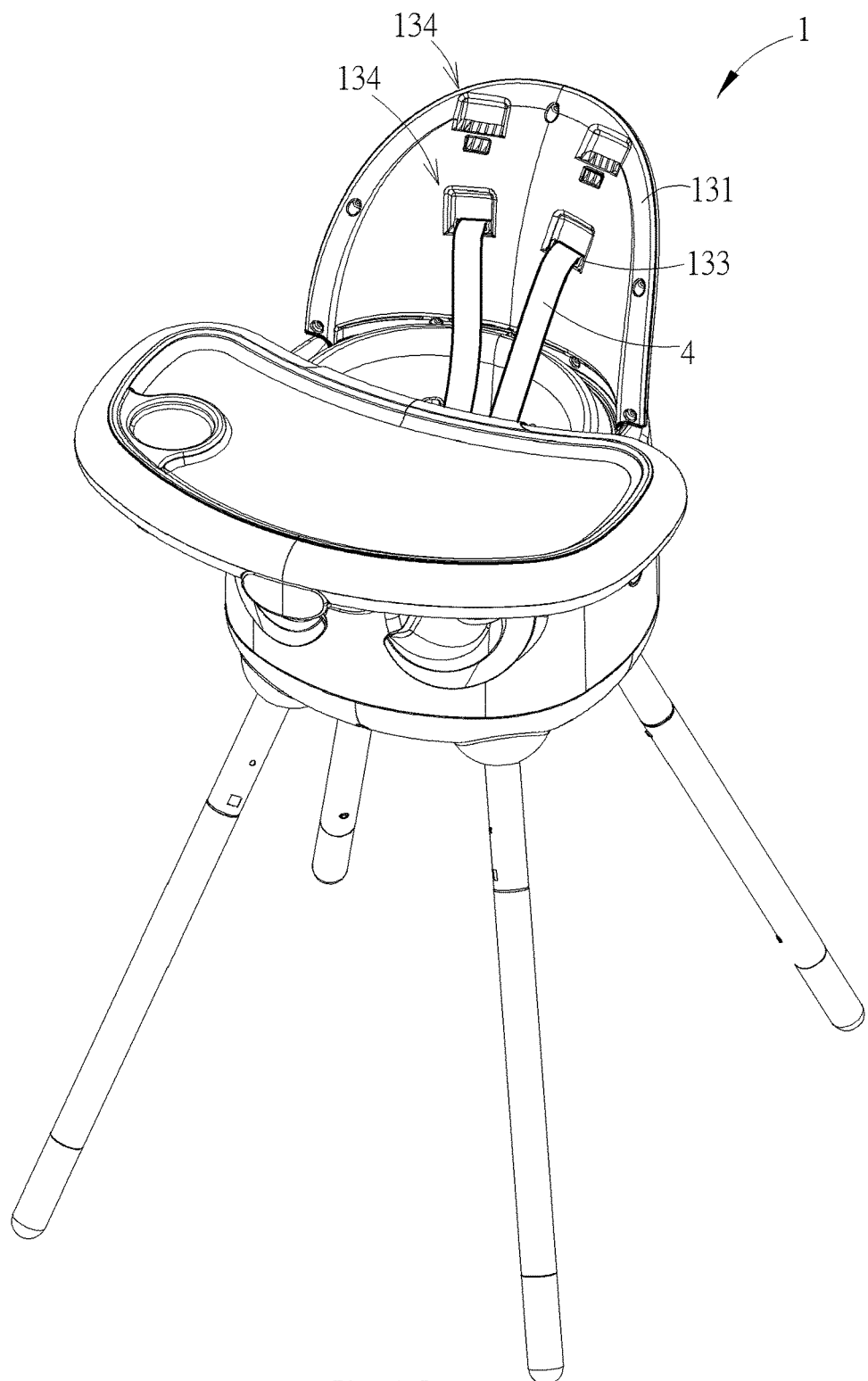
FIG. 10 is a partial enlarged diagram of the multi-function high chair according to the embodiment of the present invention.
Figure 11:
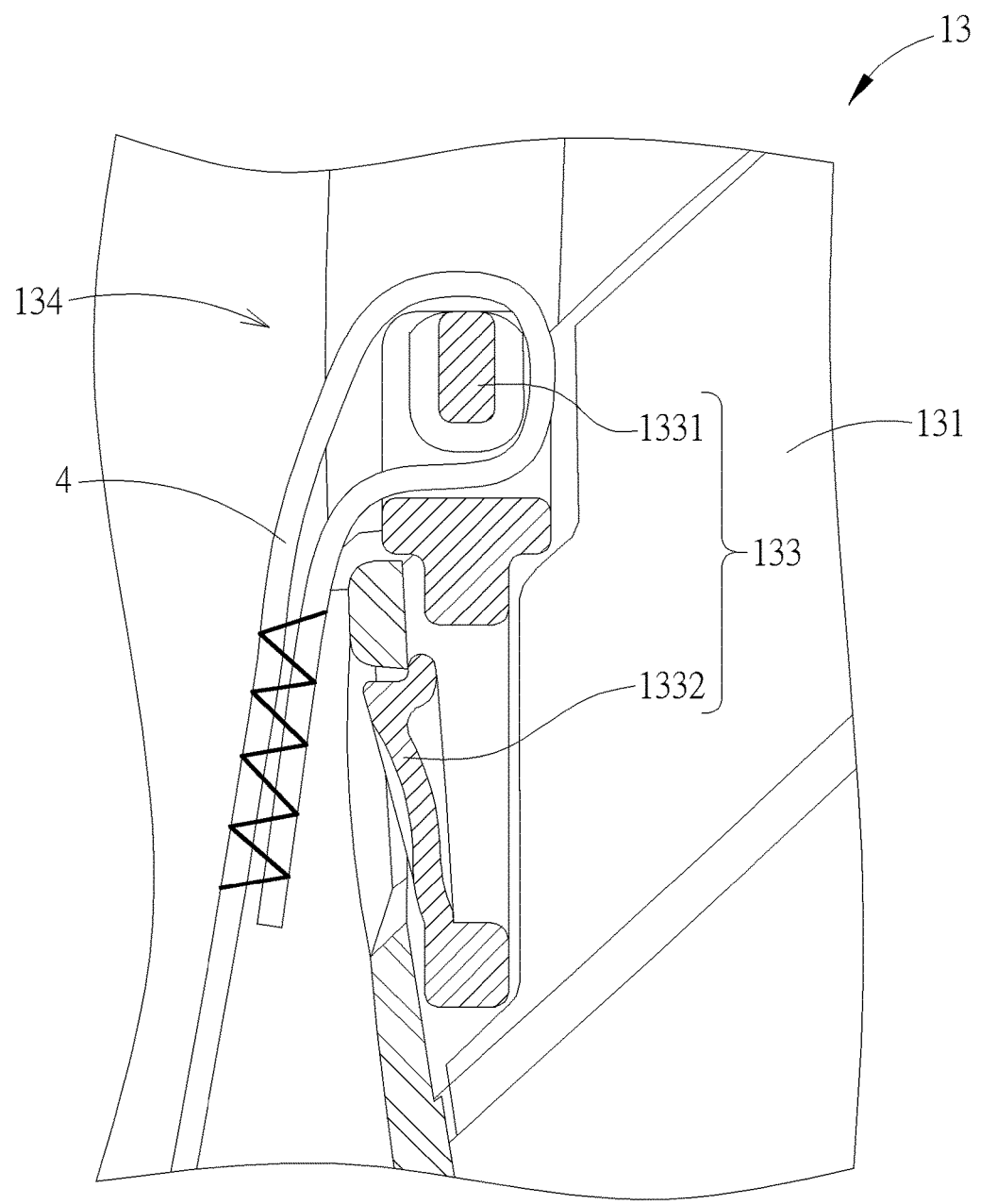
FIG. 11 is a partial sectional diagram of the seatback assembly according to the embodiment of the present invention.

Please refer to FIG. 4, FIG. 10 and FIG. 11. FIG. 10 is a partial enlarged diagram of the multi-function high chair 1 according to the embodiment of the present invention. FIG. 11 is a partial sectional diagram of the seatback assembly 13 according to the embodiment of the present invention. As shown in FIG. 4, FIG. 10 and FIG. 11, the seatback assembly 13 includes a back portion 131, a padding component 132, a pair of shoulder harness anchors 133 and two pairs of engaging sockets 134. The padding component 132 is for at least covering a front side of the back portion 131 for improving seating comfort of the child. The two pairs of engaging sockets 134 are formed on the back portion 131 and at different heights. A pair of shoulder harness straps 4 are connected to the back portion 131 by engagement of the pair of the shoulder harness anchors 133 and one pair of the two pairs of engaging sockets 134. Specifically, as shown in FIG. 11, each shoulder harness anchor 133 comprises a resilient engaging portion 1331 and a connecting portion 1332 connected to the resilient engaging portion 1331. Each shoulder harness strap 4 can be sewed onto the corresponding connecting portion 1332. Each engaging socket 134 is formed on the front side of the back portion 131, and the connecting portion 1332 is exposed out of the corresponding engaging socket 134 after each shoulder harness anchor 133 has been slidably installed into the corresponding engaging socket 134 to engage the resilient engaging portion 1331 with the corresponding engaging socket 134. In such a way, it provide a convenient way to adjust the pair of shoulder harness straps 4 according to children of different ages by engagement of the pair of the shoulder harness anchors 133 and one pair of the two pairs of engaging sockets 134. However, the numbers and the configuration of the shoulder harness anchor and the engaging socket are not limited to this embodiment. It depends on practical demands.

In contrast to the prior art, the present invention utilizes the first seat portion, the second seat portion and the infant insert to selectively provide the first seating area, the second seating area and the third seating area which have different sizes for accommodating children of different ages. Therefore, it provides caregivers with the multi-function high chair in different using states with growth of a child. Furthermore, the second child seat can be used independently as a floor seat or a booster seat and also can be attached onto the adult chair by the attachment strap after the second child seat has been detached from the first child seat. The sliding drawer can accommodate the attachment strap for preventing a potential strangulation hazard due to the hanging attachment strap. Besides, the pair of shoulder harness straps are connected to the back portion by the engagement of the pair of the shoulder harness anchors and the corresponding pair of engaging sockets. Therefore, it provides a convenient way to adjust the pair of shoulder harness straps according to children of different ages.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-function high chair comprising:
   a first child seat comprising:
      at least one leg component; and
      a first seat portion installed on the at least one leg component, a first seating area being formed on the first seat portion; and
   a second child seat comprising a second seat portion and an infant insert, the second seat portion being detachably installed on the first seat portion, a second seating area being formed on the second seat portion and smaller than the first seating area, the infant insert being detachably installed on the second seat portion and made of soft and resilient material having a shape and rigidity to provide support to an infant by softly surrounding the infant, a third seating area being formed on the infant insert and smaller than the second seating area, the second child seat further comprising a sliding drawer slidably disposed on a bottom side of the second seat portion for accommodating an attachment strap;
   wherein the second seat portion is installed on the first seat portion to cover the first seating area for allowing a child to sit in the second seating area when the infant insert is detached from the second seat portion to expose the second seating area, the second seat portion is capable of being detached from the first seat portion to expose the first seating area for allowing the child to sit in the first seating area, and the infant insert is installed on the second seat portion to cover the second seating area for allowing the infant to sit in the third seating area.

2. The multi-function high chair of claim 1, further comprising a seatback assembly selectively and detachably installed on the first seat portion or the second seat portion.

3. The multi-function high chair of claim 2, wherein the seatback assembly comprises a back portion and a padding component for at least covering a front side of the back portion.

4. The multi-function high chair of claim 2, wherein the seatback assembly comprises a back portion, a pair of shoulder harness anchors and at least two pairs of engaging sockets formed on the back portion and at different heights, and a pair of shoulder harness straps are connected to the back portion by engagement of the pair of the shoulder harness anchors and one pair of the at least two pairs of engaging sockets.

5. The multi-function high chair of claim 4, wherein each shoulder harness anchor comprises a resilient engaging portion and a connecting portion connected to the resilient engaging portion, each shoulder harness strap is sewed onto the corresponding connecting portion, each engaging socket is formed on a front side of the back portion, and the connecting portion is exposed out of the corresponding engaging socket when each shoulder harness anchor is slidably installed into the corresponding engaging socket to engage the resilient engaging portion with the corresponding engaging socket.

6. The multi-function high chair of claim 2, wherein the second seat portion comprises a seat part and a seatback part pivotally connected to the seat part, and the seatback assembly is capable of being reclined relative to the seat part at different angles by pivoting the seatback part relative to the seat part when the seatback assembly is installed on the seatback part.

7. The multi-function high chair of claim 1, wherein the second seat portion comprises a seat part and a seatback part pivotally connected to the seat part.

8. The multi-function high chair of claim 7, wherein the second child seat further comprises an engaging component, a driving component and a linking component, the driving component is movably disposed on the seatback part, the engaging component is retractably disposed on the seatback part, the linking component is connected to the driving component and the engaging component, a plurality of engaging portions is formed on the seat part, the seatback part is fixed relative to the seat part when the engaging component engages with one of the plurality of engaging portions, and the seatback part is capable of pivoting relative to the seat part when the driving component drives the engaging component by the linking component to retract so as to disengage the engaging component from the one of plurality of the engaging portions.

9. The multi-function high chair of claim 1, wherein the sliding drawer obstructs the second seat portion from being installed on the first seat portion when the sliding drawer is not completely closed.

10. The multi-function high chair of claim 9, wherein the second child seat further comprises a snapping component disposed on the second seat portion, a snapping recess is formed on the first seat portion and located at a position corresponding to the snapping component, and the sliding drawer obstructs the snapping component from engaging with the snapping recess when the sliding drawer is not completely closed.

11. The multi-function high chair of claim 1, wherein the second child seat further comprises a liner disposed on an inner periphery of the second seat portion to surround the second seating area.

12. The multi-function high chair of claim 1, wherein the second child seat further comprises a tray detachably installed on the second seat portion.

13. The multi-function high chair of claim 1, wherein the second child seat further comprises a snapping component disposed on the second seat portion, a snapping recess is formed on the first seat portion and located at a position corresponding to the snapping component, the second seat portion is fixed on the first seat portion by engagement of the snapping component and the snapping recess, and the second seat portion is detached from the first seat portion by disengagement of the snapping component and the snapping recess.

14. A multi-function high chair comprising:
a first child seat comprising:
at least one leg component; and
a first seat portion installed on the at least one leg component, a first seating area being formed on the first seat portion;
a second child seat comprising a second seat portion detachably installed on the first seat portion, a second seating area being formed on the second seat portion and smaller than the first seating area, the second seat portion comprising a seat part and a seatback part pivotally connected to the seat part; and
a seatback assembly selectively and detachably installed on the first seat portion or the seatback part of the second seat portion, the seatback assembly being capable of reclining relative to the seat part at different angles by pivoting the seatback part relative to the seat part when the seatback assembly is installed on the seatback part, the seatback assembly comprising:
a back portion;
at least two pairs of engaging sockets formed on the back portion and at different heights; and
a pair of shoulder harness anchors for engaging with one pair of the at least two pairs of engaging sockets;
wherein a pair of shoulder harness straps are connected to the back portion by engagement of the pair of the shoulder harness anchors and the one pair of the at least two pairs of engaging sockets.

15. The multi-function high chair of claim 14, wherein each shoulder harness anchor comprises a resilient engaging portion and a connecting portion connected to the resilient engaging portion, each shoulder harness strap is sewed onto the corresponding connecting portion, each engaging socket is formed on a front side of the back portion, and the connecting portion is exposed out of the corresponding engaging socket when each shoulder harness anchor is slidably installed into the corresponding engaging socket to engage the resilient engaging portion with the corresponding engaging socket.

16. A multi-function high chair comprising:
a first child seat comprising:
at least one leg component; and
a first seat portion installed on the at least one leg component, a first seating area being formed on the first seat portion;

a second child seat comprising a second seat portion detachably installed on the first seat portion, a second seating area being formed on the second seat portion and smaller than the first seating area; and a seatback assembly selectively and detachably installed on the first seat portion or the second seat portion;

wherein the second seat portion is installed on the first seat portion to cover the first seating area for allowing the seatback assembly to be installed on the second seat portion, and the second seat portion is capable of being detached from the first seat portion to expose the first seating area for allowing the seatback assembly to be installed on the first seat portion.

* * * * *